J. HAINES.
HARVESTER.
No. 6,245. Patented Mar. 27, 1849.
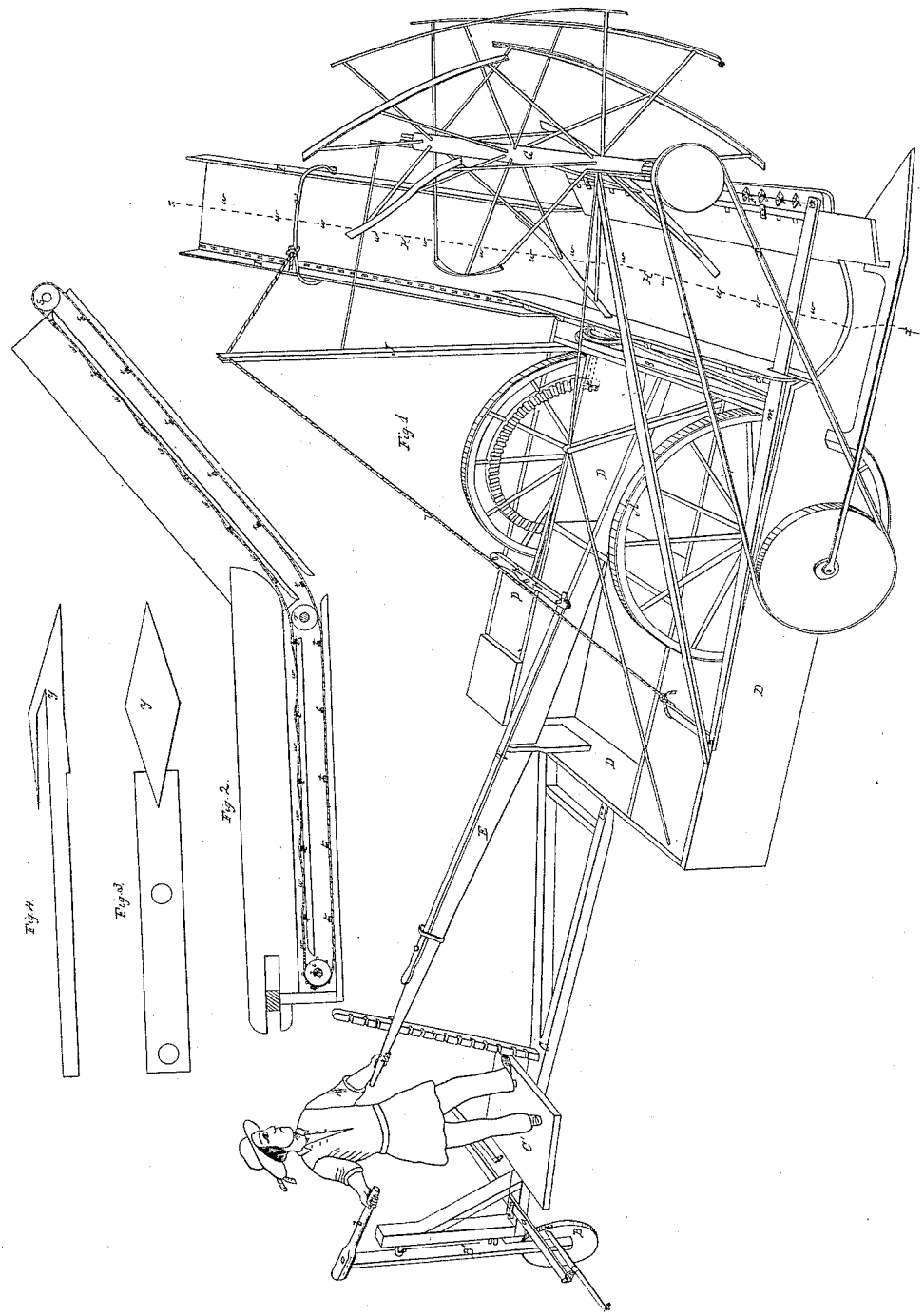

UNITED STATES PATENT OFFICE.

JONATHAN HAINES, OF UNION GROVE, ILLINOIS.

IMPROVEMENT IN HARVESTING-MACHINES.

Specification forming part of Letters Patent No. 6,245, dated March 27, 1849.

*To all whom it may concern:*

Be it known that I, JONATHAN HAINES, of Union Grove, in the county of Whiteside and State of Illinois, have invented a new and useful Machine for Harvesting Grain and Grass by Horse-Power, which I call the "Illinois Harvester," of which the following is a full and exact description, reference being had to the annexed drawings of the same, making part of this specification, in which—

Figure 1 is a perspective view of the machine ready for operation. Fig. 2 is a vertical section taken through the line $x\,x$ of Fig. 1. Fig. 3 is a plan, and Fig. 4 a side elevation, of one of the slotted fingers which advance before the sickle for the purpose of supporting the straw while the knife cuts it off.

The same letters indicate the same parts in all the figures.

In the accompanying drawings the machine is represented as being mounted upon three wheels, the two in front, A A', sustaining the principal part of the weight, the one behind, B, being chiefly designed for steering; and in order that it may the better accomplish that object it is mounted in a vertical post, B', which is hung upon hinges and capable of being turned by a tiller, $b$, in the manner of the rudder of a vessel. The horses are harnessed to the whiffletrees $a$, which are secured by a bolt to the tongue C, and push the machine before them. The tongue C is hinged to the rear end of the square part D of the frame-work, and the lever E, which projects back from the frame, is engaged by means of a catch to the notches in the sides of the post $c$, erected upon the tongue, this catch being so constructed that it can with ease be disengaged and re-engaged. The frame D rests upon the axes of the wheels A A', which form a fulcrum upon which it turns, and the projecting lever E being attached firmly to this frame, whenever it is raised or lowered it depresses or elevates the front of the machine, and thus determines the height at which the grain or grass is to be cut, the catch which engages the arm to the notched post $c$ holding it at any point of elevation at which it may be required to place it. A platform, C', is placed upon the rear end of the tongue, upon which the conductor stands, holding the tiller in one hand and the lever E in the other, in order that he may simultaneously direct the course of the machine and raise and lower the cutter to accommodate it to variations in the surface of the ground or the height of the grain, by this means avoiding both waste of the grain and the inconvenience of cutting too much straw.

The principal frame, D, may be made of plank or scantling well framed together. It carries the sickle F, reel G, conveyer H, and the gearing which puts them severally in motion.

Upon the wheel A, or upon its axis, a cog-wheel, $d$, is secured, which takes into and drives the pinion $e$, (represented in dotted lines,) upon whose axis is a pulley, $f$, which, through the medium of the belt $g$, turns the axis $h$, Fig. 2, which carries the wheels $i$, Fig. 2, that drive the conveyer H.

To the side of the pulley $f$ a crank-pin, $k$, is secured, which, through the connecting-rod $l$, communicates a horizontal vibratory motion to the lever $m$, which is transmitted to the sickle F, connected by a pivot, $n$, to its front end.

The axis of the pinion $e$ is capable of sliding longitudinally on its bearings sufficiently far to disengage it from the wheel $d$, when the machine is required to be moved, without putting the conveyer or sickle in motion. For the purpose of disengaging and re-engaging this pinion with facility the forked end of a rod, $o$, is engaged either to it or the shaft by any of the usual modes, the other end of this rod being jointed to the lever $p$, which is pivoted to the frame D at one end, and jointed to the rod $q$ at the other, the latter resting upon the lever E and extending back far enough to be within the reach of the conductor. This rod is provided with two catches, which, when engaged, will respectively hold the pinion $e$ in or out of gear with the wheel $d$.

The endless conveyer H is for the purpose of elevating the cut grain into the bed of a wagon, which accompanies the machine to receive the same. That portion of the conveyer which is immediately behind the sickle is horizontal, but the part projecting beyond the side of the machine is inclined at a suitable angle for raising the grain over the side of the box of the accompanying wagon. That part, I, of the frame in which the inclined part of the conveyer is supported is hinged to the side of the frame D, as seen in Fig. 2, and its outer end is raised and lowered by the cord $u$, passing through a slot or notch in the top of the post J and secured to a bail, $u'$, which arrangement renders the conveyer capable of elevating the grain to different heights, and also allows the frame I to yield when it comes in contact with obstructions that might break it if it were rigidly connected to the frame.

The conveyer consists of two parallel endless belts passing round the driving pulley or wheel $i$, the bearing-pulley $r$, and the stretching-pulley $s$. These belts are held at the proper distance apart by slats $t$, and the whole is covered by a web of cloth, which is loose enough to bag down between the slats, forming a series of shallow depressions, $w$, which retain any grain that may be shelled out by the action of the sickle or reel until discharged into the wagon-box, a great deal of which grain would roll off the sides of the cloth if it were tightly stretched over the slats. These shallow bags also render the conveyance of the grain up the apron, when its inclination is very steep, much more certain and regular.

The reel G is made and arranged in the usual or in any suitable manner, and receives its motion from the wheel $A'$ through the belt $x$.

The slotted fingers $y$, Figs. 3 and 4, for dividing the grain, supporting it while being cut, and preventing the sickles getting damaged from sticks, stones, and other obstructions against which the machine may happen to run, are secured to a bar which extends across the front end of the machine at suitable distances apart. The front ends of these fingers are inclined downward, in order that when the grain is pressed against them by the sickle or knife it may be pulled slightly upward, which favors the cutting very much and greatly diminishes the force required to effect it.

This machine is mainly designed for harvesting grain by cutting off the heads and leaving the straw upon the ground, the heads being elevated by the conveyer and discharged into the box of a wagon. The heads of grain thus gathered are either stacked in the open air or garnered in a barn, as may be deemed expedient.

If the grain, when cut, is not ripe enough to be garnered, the sickle may be lowered so as to cut the straw at the usual height from the ground, and the conveyer placed in a horizontal position, so as to lay the grain in a swath, where it may be allowed to remain until cured; or it can be bound in sheaves in the usual way.

To adapt the machine for cutting grass for hay it is merely requisite to lower the sickle as near the ground as possible without running into it.

As the machine is operated in other respects besides those I have particularly mentioned in the same way that others are, I do not deem it necessary to enter into a detailed description of all the minutiæ of its management.

Having thus described the construction and operation of my improved harvester, what I claim therein as new, and desire to secure by Letters Patent, is—

Suspending the frame which carries the conveyer, reel, and cutter upon the axles of the wheels A $A'$, when the frame thus suspended is hinged to the tongue and rendered capable of being turned upon its bearings by means of a lever for the purpose of elevating and depressing the cutter, as herein set forth.

Union Grove, December 7, 1848.

JONATHAN HAINES.

Witnesses:
WM. C. SNYDER,
SAMUEL KING.